United States Patent [19]
Kanai et al.

[11] Patent Number: 4,793,201
[45] Date of Patent: Dec. 27, 1988

[54] POROUS STATIC PRESSURE GUIDE

[75] Inventors: Munenori Kanai; Sunao Ishihara; Hiroo Kinoshita, all of Tokyo, Japan

[73] Assignee: Nippon Telegraph and Telephone Corporation, Tokyo, Japan

[21] Appl. No.: 95,038

[22] Filed: Sep. 9, 1987

[30] Foreign Application Priority Data

Jun. 29, 1987 [JP] Japan .................. 62-159737
Aug. 21, 1987 [JP] Japan .................. 62-206567

[51] Int. Cl.$^4$ .................. F16H 25/24; F16C 32/06
[52] U.S. Cl. .................. 74/424.8 R; 10/86 R; 74/459; 74/468; 384/107; 384/907.1; 427/438
[58] Field of Search .............. 74/89.15, 424.8 R, 459, 74/468; 10/86 R; 384/12, 107, 907.1; 427/438

[56] References Cited

U.S. PATENT DOCUMENTS

| | | | |
|---|---|---|---|
| 3,171,295 | 3/1965 | Benckert | 74/424.8 R |
| 3,670,583 | 6/1972 | Leming | 74/89.15 |
| 4,695,489 | 9/1987 | Zarnoch et al. | 427/438 |
| 4,710,034 | 12/1987 | Tittizer et al. | 384/279 X |

FOREIGN PATENT DOCUMENTS

| | | |
|---|---|---|
| 59-113360 | 6/1984 | Japan . |
| 60-241566 | 11/1985 | Japan . |
| 61-103053 | 5/1986 | Japan . |
| 184106 | 7/1966 | U.S.S.R. .................. 384/12 |

OTHER PUBLICATIONS

"Hydrostatic Lead Screws" by John H. Rumbarger et al., Machine Design, Apr. 11, 1968, pp. 218-224.
Japan Society of Precision Engineering, No. 49, Jul., (1983), p. 889; Aug. (1983), p. 1083; Jun., (1983), p. 760.
Junkatsu, 20, May (1975), p. 393.
Japan Society of Precision Engineering, No. 48, Oct. (1982), p. 1291, 1341.

*Primary Examiner*—Allan D. Herrmann
*Attorney, Agent, or Firm*—Blakely, Sokoloff, Taylor & Zafman

[57] ABSTRACT

A static pressure lead screw includes a porous ceramic body having fluid flow paths as part of a flank. The porous ceramic body is fixed by a tubular base member through which the fluid does not flow. Fluid guide holes for supplying the fluid to the porous body extend through the tubular base member and are connected to the porous body. In a preferred embodiment, an electroless-plated layer is formed in a surface layer of the flank or an inner portion continuous with the surface layer, thereby obtaining various high-accuracy static pressure guides with high statical stiffness.

32 Claims, 12 Drawing Sheets

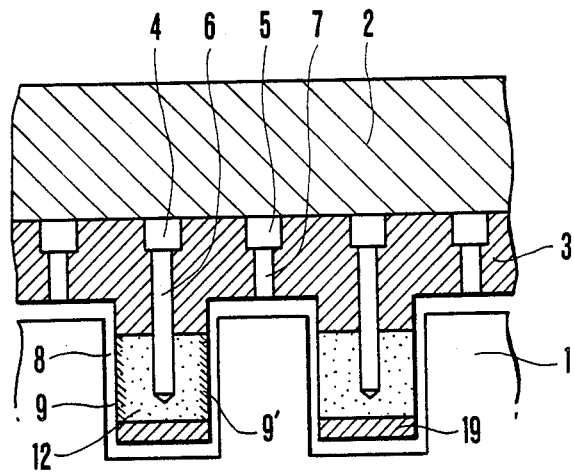
F I G. 4(a)
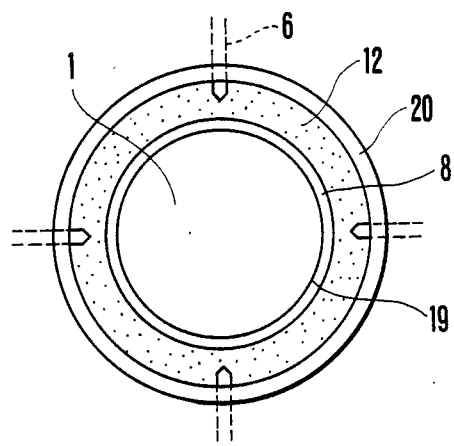
F I G. 4(b)

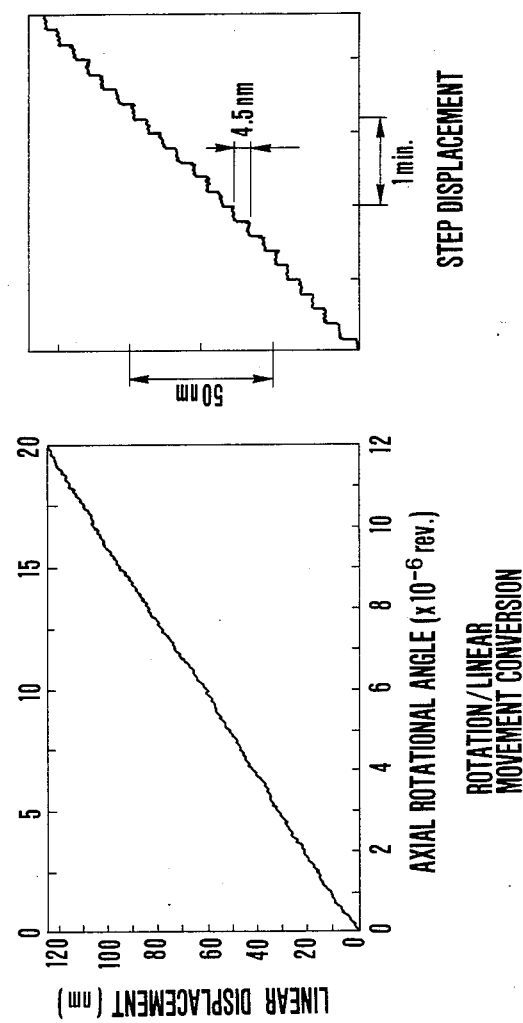
F I G. 10(b)
F I G. 10(a)

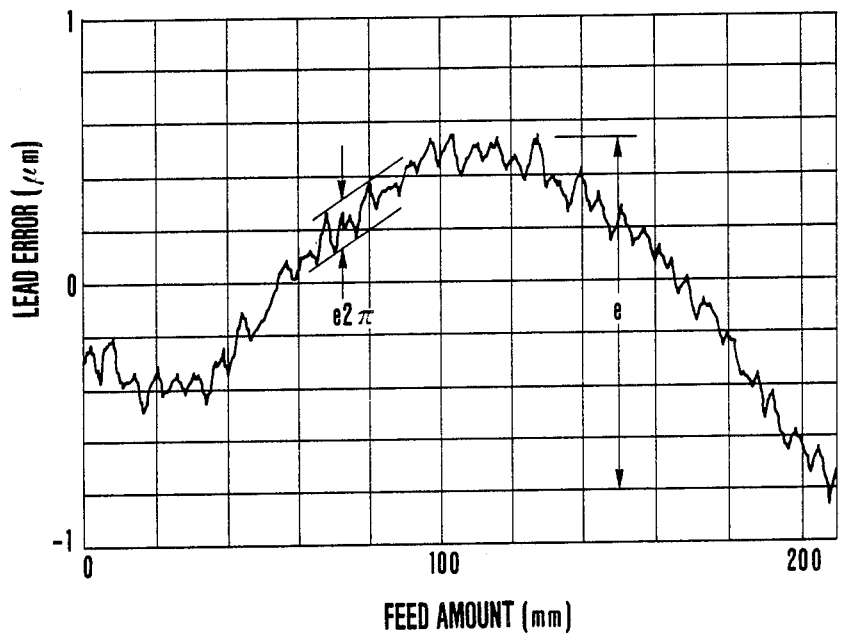
F I G.12

POROUS STATIC PRESSURE GUIDE

BACKGROUND OF THE INVENTION

A static pressure lead screw is known as a means for achieving high-speed, high-accuracy feeding for converting rotational movement into linear movement. In the static pressure lead screw, a pressurized fluid is supplied between male and female screws or external and internal threads to support them through the pressurized fluid. A fluid bearing is also proposed to supply a pressurized fluid to a gap between a rotating shaft and a bearing for supporting it. These mechanical elements are so-called static pressure guides. The present invention particularly relates to a porous static pressure guide comprising a porous body for a bearing surface, a static pressure lead screw, and a feed mechanism using the same.

Conventional static pressure lead screws as one type of static pressure guides will be briefly described below. A static pressure lead screw serves as a static pressure guide wherein a pressurized fluid is supplied to a gap between male and female screws (this gap is referred to as a screw gap hereinafter) to support the male and female screws through the pressurized fluid in a non-contact manner. The static pressure lead screws are classified into a hydrostatic lead screw and a pneumostatic lead screw according to the types of working fluid. These static pressure lead screws are not subjected to solid friction and are free from stick-slip and backlash. Feed accuracy can be greatly improved by a fluid film averaging effect. In addition, since no solid friction occurs in the static pressure lead screw, accuracy is not permanently degraded. For these and other reasons, in recent years, the static pressure lead screws have received a great deal of attention for a variety of applications in high-accuracy, high-speed apparatuses such as apparatuses for manufacturing semiconductor elements and optical components and electronic equipment.

However, since the fluid is supplied, the structure of the female screw is complicated. In addition, design is difficult and more accurate machining is required, thus posing many problems to be solved. Therefore, practical static pressure lead screws have not yet been proposed. In particular, it is difficult to increase stiffness of an air lubrication film between the male and female screws in a pneumostatic lead screw using a gas of a very low viscosity. No practical pneumostatic lead screws are proposed.

The structures of conventional hydrostatic lead screws are described in Journal of the Japan Society of Precision Engineering (JSPE) 49, July (1983), P. 889 and Journal of the Japan Society of Precision Engineering 48, October (1982), P. 1291.

Oil supply holes directly influence an amount of fluid supplied to a screw gap and uniformity of the flow and directly dominate the performance of the hydrostatic lead screw. High machining accuracy of the oil supply holes is required. When the hydrostatic lead screw is to be made compact, it is difficult to precisely form helical oil supply and recovery holes in small mechanical parts. Therefore, compactness of the hydrostatic lead screws cannot be easily achieved.

In the pneumostatic lead screw using a gas (e.g., air) as a working fluid, statical stiffness between the male and female screws is more important than in the hydrostatic lead screw. This is because the viscosity coefficient of the gas is as extremely small as the order of 1/1,000 and the used gas is a compressible fluid. For these reasons, the screw gap in the pneumostatic bearing must be smaller than that in the hydrostatic bearing and must fall within the range of several microns to a value between 10 and 20 microns. The pneumostatic lead screw uses a flank as an air bearing surface. In order to obtain the gap described above, surface flatness, geometrical accuracy, and pitch accuracy must be very high in machining of the female and male screws. In addition, orifice restrictors must be formed for a large number of air supply holes to give statical stiffness to the lead screw. Difficulties in complicated more accurate machining result in a bulky pneumostatic lead screw at high cost. A practical pneumostatic lead screw cannot be realized.

FIGS. 13(a) and 13(b) are sectional views of conventional pneumostatic lead screws (Japanese Patent Laid-Open (Kokai) Nos. 59-113360 and 60-241566). Exhaust paths are not illustrated in FIGS. 13(a) and 13(b).

Referring to FIGS. 13(a) and 13(b), nuts 3 are made of porous bodies and serve as porous restrictors, respectively. The pneumostatic lead screws in FIGS. 13(a) and 13(b) have similar structures. However, in the pneumostatic lead screw in FIG. 13(b), portions (indicated by thick lines) excluding the flanks are sealed. With this structure, air supply holes need not be formed, as shown in the lead screw in FIG. 13(a). Otherwise, the air supply holes in FIG. 13(b) are formed by simply boring the porous body. In addition, the flanks are formed by simple thread cutting. Since the porous restrictors have high air supply efficiency and the statical stiffness of the pneumostatic lead screw can be improved as compared with lead screws employing other types of restrictor. However, when the porous body is a metal porous body, clogging during drilling or cutting may pose a problem due to plastic deformation of the material. When the flanks 9 in FIGS. 13(a) and 13(b) or the wall surfaces defining air supply holes 6 in FIG. 13(b) clog, the air flow paths are blocked, and the lead screws do not serve as pneumostatic lead screws. Proper clogging of an air blow surface in a porous air bearing is required to improve the axial stiffness as in the orifice restrictor. If a free margin is given in machining of the bearing surface in a planar bearing such as a linear thrust bearing, such a clogging effect can be effectively utilized. However, when the floating screw gap is determined by the machining amount due to the dimensional limitations of opposite bearing surfaces as in a radial bearing, a pneumostatic lead screw, or the like, it is difficult to control proper clogging during machining. Furthermore, a workpiece clogging amount varies depending on various conditions such as the types of material, the cutting depth, and a machining speed. Therefore, both the clogging amount and machining accuracy cannot be simultaneously satisfied.

The externally pressurized air bearing has a problem of pneumatic hammer. "Pneumatic hammer" is a self-excited vibration caused by compressibility of the gas. The pneumatic hammer tends to occur in a gas bearing having a large flow path volume, such as a pocketed orifice restrictor and a porous restrictor. The nuts in FIGS. 13(a) and 13(b) are made of porous bodies and have large flow path volumes. Therefore, the pneumatic hammer tends to occur in these lead screws.

Pore collapsing in a conventional porous bearing will be briefly described. In a conventional externally pressurized porous bearing, a sectional area of a porous surface layer for causing a fluid to pass therethrough is reduced by pore collapsing, as shown in FIG. 14. The porous body is prepared by sintering particles of a metal powder at a temperature lower than a melting point, and spaces defined by the bonded particles constitute a fluid path. The porous body is easily accessible at low cost since it has been used in a variety of applications in sintered oil-containing bearings and filters.

Pore collapsing in the porous metal body is performed by utilizing plastic deformation. More specifically, cutting or grinding is performed by selecting cutting conditions such as sharpness of a cutting edge of a cutting tool, a cutting depth, a machining speed, or a machining temperature. The sectional area of the fluid path present on the porous body surface can be decreased by plastic deformation. Therefore, an amount of plastic deformation corresponds to an increase in flow resistance. Since numerous large and small holes are present on the the porous body surface, the small pores are collapsed when an amount of plastic deformation is increased. Semi-closed pores and almost open pores are left according to a given probability. This is the principle of surface layer restrictor by pore collapsing. The flow resistance of the porous body surface layer is controlled by an amount of plastic deformation.

Pore collapsing by plastic deformation is limited to a material subjected to plastic deformation, and the machining conditions must be properly selected. Variations in sintering strength and hardness adversely affect machining conditions. Friction and wear of the machining tools fail to guarantee good machining conditions. Reproducibility and productivity are poor since plastic deformation itself is based on machining with skills or machining according to a given probability. In this sense, a uniform pore-collapsed surface cannot be formed. In particular, when an amount of plastic deformation is near the particle size of the powder constituting the porous body, removal and reattachment of particles simultaneously progress. The wear of the cutting tool and damage thereto are increased. It cannot be expected to accurately control pore collapsing accuracy of the pore-collapsed surface. Great degradation of machining accuracy of the pore-collapsed surface is inevitable. Plastic deformation is a factor opposite to improvement of machining accuracy. However, as described above, machining accuracy improves performance of the static pressure guide itself directly. Pore collapsing by plastic deformation is a surface layer restrictor formation technique controversial to high performance of the static pressure guide.

Pore collapsing greatly changes the flow resistance of the porous body. In order to assure statical stiffness o the static pressure guide, a flow path resistance ratio must be set such that a peak value of an intermediate pressure Pm is given to be about ⅔ the supply pressure Ps. Control must cover control of the flow resistance of the overall porous restrictor in addition to control of uniform pore collapsing of the porous body surface. For this reason, it is not going to far to say that accuracy of pore collapsing determines the performance of the static pressure guide. However, practical static pressure guides rarely employ porous restrictors. Conventional surface restrictors are most popular in static pressure guides. This fact explicitly indicates that problems for controlling the flow resistance to achieve porous restrictors and for forming surface layer restrictors are left unsolved.

SUMMARY OF THE INVENTION

It is a primary object of the present invention to provide a porous static pressure guide having statical stiffness higher than that of a conventional static pressure guide.

It is another object of the present invention to provide a porous static pressure guide wherein machining can be easier than conventional machining and machining accuracy can be improved as compared with conventional machining.

It is still another object of the present invention to provide a porous static pressure guide wherein clogging tends not to occur regardless of use of a porous material.

It is still another object of the present invention to provide a porous static pressure guide wherein restrictor characteristics of a porous material can be easily optimized.

It is still another object of the present invention to provide a static pressure lead screw having high statical stiffness even through the screw has a small diameter.

It is still another object of the present invention to provide a static pressure lead screw free from a pneumatic hammer.

It is still another object of the present invention to provide a static pressure lead screw capable of performing ultra precise feeding with a long stroke and a feed mechanism using the same.

The porous static pressure guide according to the present invention comprises a porous body of a ceramic material formed on a solid base member, wherein a guide hole is formed to extend through the solid base member and guided inside the porous body to supply a fluid to an interior of the porous body, thereby separating the porous body from an opposite object.

The static pressure lead screw according to the present invention comprises a porous ceramic body wherein at least part of the flank has a fluid supply path. The porous ceramic body is fixed by a tubular base member through which a fluid does not flow. Holes for supplying the fluid to the porous body are connected to the porous body through the tubular base member.

According to a preferable embodiment of the static pressure lead screw of the present invention, main parts of thread ridges of the nut are made of a porous ceramic body, the porous ceramic body is fixed to a tubular base member through which the fluid does not flow. Fluid supply holes are connected to the porous ceramic body thorough the tubular base member. Electroless plating is performed for a surface layer of each flank of the porous ceramic body or an inner portion continuous with surface layer.

According to a method of manufacturing a static pressure lead screw of the present invention, a tubular base member obtained by fixing at least a porous hollow cylinder inside a multilayered cylinder is machined from the interior thereof and thread of the nut are formed such that at least part of each flank is made of the porous ceramic body, and fluid supply holes are formed such that they reach the porous ceramic body. The flank is plated by electroless plating after thread cutting.

The static pressure guide (i.e., static pressure bearing and the like) excluding the static pressure lead screw has the following structure. The static pressure guide includes a movable member subjected to a rotational or linear displacement, a stationary member located to oppose a surface layer of the movable member through a gap, and a fluid filled in the gap between the movable and stationary members, wherein a surface of the movable member which defines the gap is made of a porous body, and the porous body pores are selectively sealed by electroless plating.

The porous body is used for fluid supply paths for only the flanks of the static pressure lead screw according to the present invention. The porous body constitutes flow paths and serves as a flow path resistance member. Fluid supply ports and a pocket need not be formed in the flanks. In the static pressure lead screw or bearing having a porous ceramic body surface plated by electroless plating, the flow path resistance of the porous ceramic body can be adjusted by electroless nickel plating, thereby obtaining a maximum restrictor effect. Therefore, the compact static pressure lead screw or bearing having high stiffness can be manufactured by a simple process. When a square screw thread is employed wherein a thread ridge angle is perpendicular to the screw axis, only an axial machining force acts thereon. A bending force does not act on the screw, thereby improving machining accuracy.

BRIEF DESCRIPTION OF THE DRAWINGS

FIGS. 4(a) and 4(b) are views showing a static pressure lead screw using a porous restrictor according to a fourth embodiment of the present invention;

FIGS. 10(a) and 10(b) are views showing an a feed resolution of the static pressure uniaxial feed mechanism;

FIG. 12 is a graph showing feed accuracy of the static pressure uniaxial feed mechanism;

DESCRIPTION OF THE PREFERRED EMBODIMENTS

Embodiments of static pressure lead screws will be described below.

First Embodiment

Figure 1A:
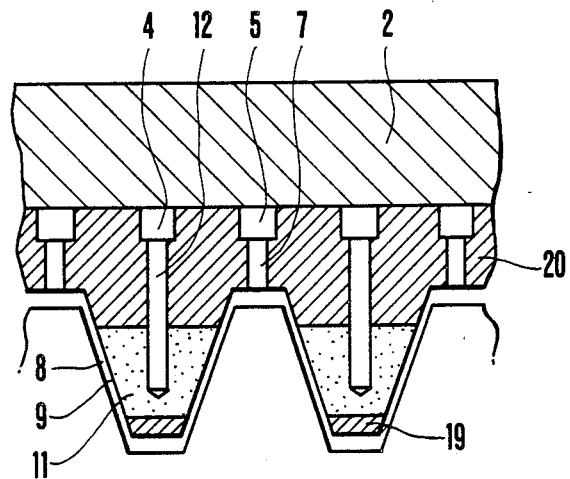
FIG. 1(a) is a sectional view of a static pressure lead screw using a porous restrictor according to a first embodiment of the present invention.
Figure 13A:
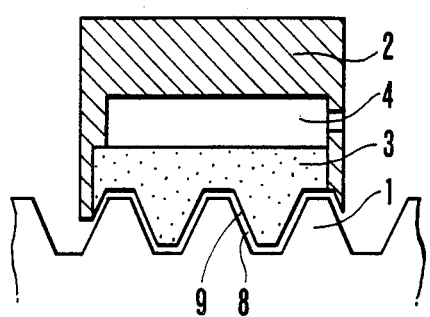
FIGS. 13(a) and 13(b) are sectional views showing conventional pneumostatic lead screws, respectively.
Figure 13B:
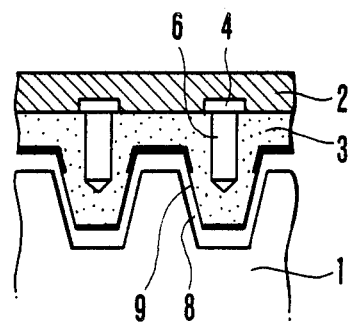
Figure 14:
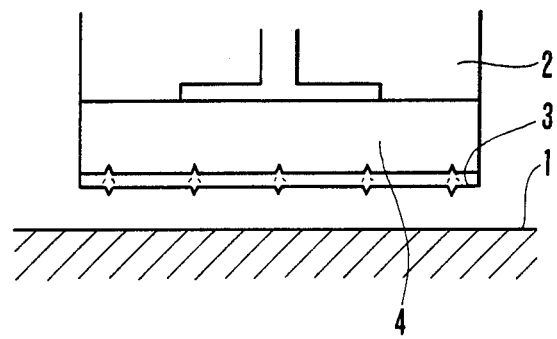
FIG. 14 is a sectional view showing a conventional pressure supply structure in a pore-collapsed porous body.

FIG. 1(a) shows a first embodiment of the present invention. Reference numeral 11 denotes a porous body; and 12, a guide hole between each supply groove 4 and the porous body 11. The same reference numerals as in FIGS. 13(a) and 13(b) and FIG. 14 denote the same parts in FIGS. 1(a) and 1(b). Reference numerals 19 denote crests made of a material of an inner cylinder 15 (to be described later) shown in FIG. 3(a); and 20, a screw body or a solid base member made of a material of an outer cylinder 16 (to be described later) shown in FIG. 3(a). A fluid passes through guide holes 12 and reaches the porous body 11 and is then supplied to right and left screw gaps 8 of each thread ridge.

Figure 1B:
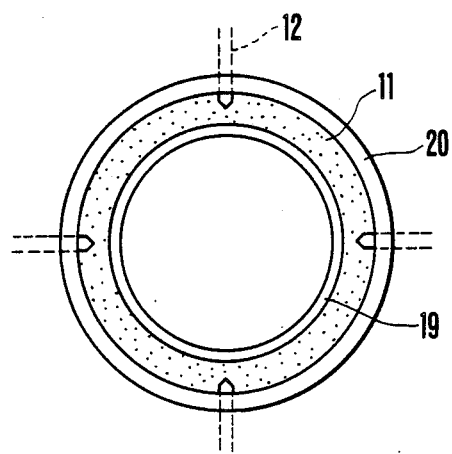
FIG. 1(b) is a view showing a flank of the first embodiment.

FIG. 1(b) illustrates a portion near a flank of the static pressure lead screw shown in FIG. 1(a) when viewed from the screw feed direction. The flank is helically continuous in a direction perpendicular to the surface of the drawing, but a sectional view thereof is omitted. The guide holes 12 located behind the flank 9 are indicated by the broken lines. The guide holes 12 are located at positions corresponding to the ridges, respectively.

In general, the porous body 11 is constituted by numerous continuous microspaces and serves as a restrictor using the flow resistance upon flowing of the fluid through the porous body 11. For this reason, with this structure, the porous body 11 serves as a fluid supply path and as a means for applying a flow resistance (i.e., a restrictor). Although the porous material has surface waving and roughness since it is sintered, the flanks of the lead screw are tooled to obtain predetermined accuracy according to the present invention. Therefore, the surface of the porous body directly serves as a bearing surface. With the structure according to the present invention, a self-forming restrictor, an orifice restrictor, or a surface restrictor need not be formed. In addition, high machining accuracy of the supply holes reaching the flanks in the conventional lead screw is required, however, in this invention the supply hole is formed with accuracy for allowing the hole to communicate with the interior of the porous body. Only one supply hole is required to supply a fluid to the right and left flanks. As is apparent from the above description, the static pressure lead screw can be easily machined to achieve compactness and low cost.

The porous restrictor allows supply of the pressurized fluid from the entire surface of the porous body, and then the range of the pressure in the gap can be widened. This indicates that a load acting on the static pressure lead screw or bearing can be increased, and their statical stiffness can also be improved.

A gas such as air or a liquid such as an oil can be used in the static pressure lead screw according to the present invention. In this case, although the viscosity of the gas is greatly different from that of the liquid, the porous body 11 having an optimal flow resistance for the gas or liquid can be selected. An optimal flow rate of the fluid is determined by a ratio of the screw gap to the porosity of the porous body. When the screw gap is increased, the porosity must be increased accordingly. However, when the screw gap is decreased, the porosity can be decreased, thereby obtaining an optimal design value. The porosity of the porous body can be adjusted by a particle size of a material prior to sintering.

Second Embodiment

Figure 2:
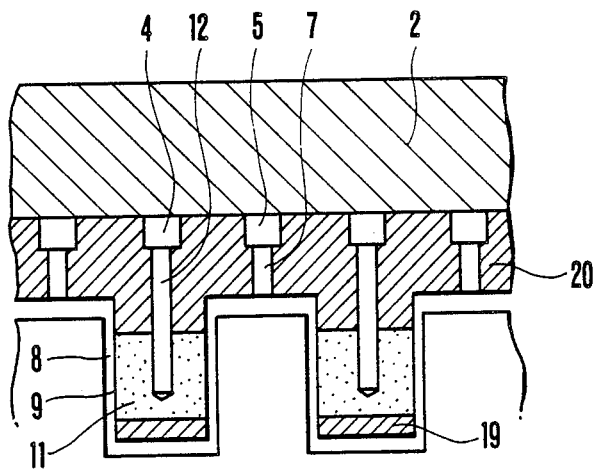
FIG. 2 is a sectional view of a static pressure lead screw using a porous restrictor according to a second embodiment of the present invention.

FIG. 2 shows a second embodiment of the present invention. In a conventional static pressure lead screw, the flanks 9 constitute a trapezoidal or triangular screw thread because a static pressure acts on the lead screw in a radial direction thereof to cause the nut to receive a load in a direction perpendicular to the feed direction or have a self-centering ability, and to allow easy connection of supply holes easily to the flanks. However, in such a thread profile, it is difficult for a machine tool to produce threads with good reproducibility and high accuracy. More specifically, since machining is performed using a die having a shape corresponding to the thread profile, it is not easy to machine flanks with high accuracy. In particular, a machining force in the radial direction of the lead screw is large. Under this condition, during machining of the male screw in which a feed speed is predetermined, bending moment components cause deformation of the male screw and which causes pitch error of the thread. As a result, accurate machining is not allowed. Judging from the above fact, in a square screw thread in which a ridge angle is formed to define a line perpendicular to the screw feed direction, deformation rarely occurs during machining. Therefore, the square screw having a ridge angle defining a line perpendicular to the screw feed direction is used in high-accuracy feed screw used in a lead screw in a machine tool. The static pressure lead screw according to the present invention can easily achieve high-accuracy screw feeding as the primary purpose of the static pressure lead screw since the ridge angle can be formed to define a line perpendicular to the screw feed direction, as compared with the conventional case. A separate linear guide parallel to the static pressure lead screw may be provided for a load in a direction perpendicular to the feed direction. Since the linear guide does not have a complicated shape unlike in the feed screw, it is possible to obtain a truely linear guide with high stiffness. It should be noted that the ridge angle in the static pressure lead screw according to the present invention is not limited to be set in a direction perpendicular to the feed direction but can be arbitrarily set to form a triangular screw thread, a trapezoidal screw thread, or the like.

In the static pressure lead screws shown in FIGS. 1(a) and 1(b) and FIG. 2, the porous bodies 11 are formed in parts of the ridges. In this case, the entire portion between the crest and the root may be constituted by the porous body. The guide holes 12 can reach only the porous body 11 but need not be formed therein. Various changes and modifications may be made within the spirit and scope of the invention.

Third Embodiment

Figure 3A:
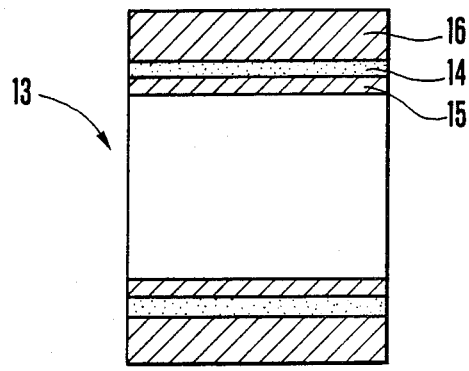
FIGS. 3(a), 3(b), and 3(c) are sectional views for explaining the steps in manufacturing a static pressure lead screw using a porous restrictor according to a third embodiment of the present invention.
Figure 3B:
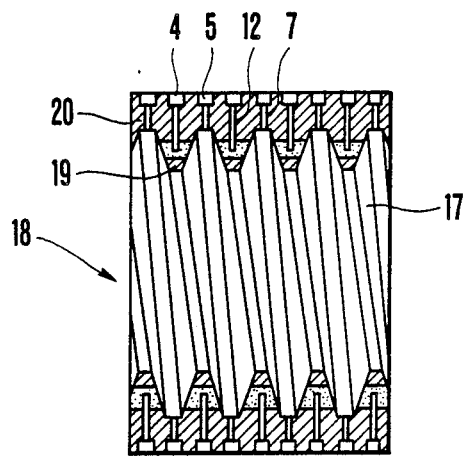
Figure 3C:
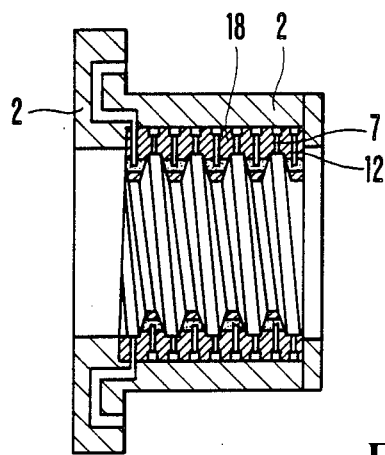

FIGS. 3(a), 3(b), and 3(c) show a third embodiment for explaining a method of manufacturing a static pressure lead screw according to the present invention. More specifically, FIG. 3(a) shows the step of preparing a base member 13 constituting a nut of the static pressure lead screw according to the present invention, in which reference numeral 14 denotes a porous hollow cylinder; 15, an inner cylinder; and 16, an outer cylinder. The base member 13 is prepared such that the inner and outer cylinders 15 and 16 are fitted in and on the inner and outer surfaces of the porous hollow cylinder 14. After the inner, outer, and porous hollow cylinders 15, 16, and 14 separately prepared are integrally fitted, they are bonded by thermal diffusion. Alternatively, a porous material may be inserted in a gap between the inner and outer cylinders 15 and 16, and the resultant structure may be sintered. According to still another method, a porous portion is formed by plasma flame spraying on the outer surface of the inner cylinder 15 and a porous portion is also formed by plasma flame spraying on the inner surface of the outer cylinder 16, the inner cylinder 15 is then fitted in the outer cylinder 16, and the resultant structure is bonded to each other. Various other methods may also be utilized.

FIG. 3(b) shows a nut 18 of the static pressure lead screw. A female screw portion 17 is formed in the base member 13 by known cutting and grinding. Spiral fluid supply and exhaust grooves 4 and 5 are also formed by cutting or grinding, and guide and exhaust holes 12 and 7 are formed by drilling. FIG. 3(c) shows a state wherein the nut 18 is built into a case 2 by press fitting or shrink fitting. As is apparent from FIG. 3(c), the guide and exhaust holes 12 and 7 may be formed in the case 2. Unlike in the conventional static pressure lead screw, a large number of high-accuracy supply holes and flow grooves need not be formed. Only parts to be machined are flanks which are indispensable elements in the static pressure lead screw, thereby reducing an influence acting on machining accuracy and hence simplifying machining. Therefore, a high-performance static pressure lead screw at low cost can be provided. In the conventional static pressure lead screw wherein the supply holes and flow path grooves must be precisely formed, the material of the nut 18 is limited to a metal. However, according to the present invention, the base member 13 may be replaced with a ceramic base material. The static pressure lead screw is formed in preliminary sintering, and the preliminarily sintered body is finally sintered. Only flanks of the screw are then ground or lapped with high accuracy. Therefore, a ceramic static pressure lead screw can be obtained. A ceramic material has better high-accuracy machining characteristics such as high stiffness and small mmachining distortion as compared with a metal. In addition, the ceramic material is free from plastic deformation, and clogging of the porous body during machining need not be taken into consideration. In this sense, the ceramic material is very advantageous in realizing the static pressure lead screw of the present invention. In addition, the ceramic material has a low thermal expansion coefficient and is lightweight. Therefore, the ceramic material is a material suitable for high-speed, high-accuracy machining as the primary purpose of the static pressure lead screw.

In the embodiment shown in FIGS. 3(a) to 3(c), the inner cylinder is used. However, the static pressure lead screw shown in FIG. 3(c) can be manufactured without using the inner cylinder.

As described above, the high-accuracy supply holes and flow path grooves need not be formed in the static pressure lead screws having the porous restrictors and represented in the first and second embodiments unlike in the conventional self-forming restrictor or surface restrictor type static pressure lead screws. Therefore, machining can be simplified. In addition, the thread ridge angle can be arbitrarily selected, and the static pressure lead screws of the first and second embodiments can have a variety of applications. Realization of a screw having the ridge angle formed in a direction perpendicular to the axial direction thereof, which is almost impossible in the conventional lead screws, leads to high-accuracy feeding as the primary purpose of the static pressure lead screw. Unlike in the conventional static pressure lead screw, at least two flanks (formed at two sides of each ridge) need not be formed for each ridge. Only one guide hole (for the right and left flanks of each ridge) is formed for each ridge, thereby obtaining a compact static pressure lead screw. In addition, the porous restrictor has a self control ability of the flow rate as compared with the conventional restrictor. Therefore, the static pressure lead screw has advantages in that, for example, the statical stiffness of the static pressure lead screw can be improved, its performance can be improved, and its cost can be reduced.

The method of manufacturing the static pressure lead screw according to the third embodiment of the present invention has advantages in that the base member for the porous restrictor type static pressure lead screw can be easily obtained by utilizing various methods and that a ceramic static pressure lead screw can be achieved, thereby performing high-speed, high-performance screw feeding utilizing the advantages of the ceramic material.

The features of the static pressure lead screw of the present invention can be effectively utilized in high-accuracy feeding of a workpiece and a machining-/measuring tool in an apparatus for performing high-accuracy machining or high-accuracy measurement, high-speed, high-accuracy driving in an x-y stage used in micropattern lithography or testing during the semiconductor element manufacturing process, and write access of an optical or magnetic disk drive and high-speed, high-accuracy positioning of a read head.

Fourth Embodiment

FIGS. 4(a) and 4(b) show a fourth embodiment of the present invention. The same reference numerals as in FIGS. 1(a) and 1(b) denote the same parts in FIGS. 4(a) and 4(b), and a detailed description thereof will be omitted.

In general, a porous metal material is subjected to clogging of a machined surface during machining and an air permeability of the material is greatly decreased. Bearing performance is therefore extremely degraded. Clogging occurs when the material is plastically deformed during machining. One of the reasons why a ceramic material is used to form a porous body is based on clogging. More specifically, since the ceramic material is a material having no tenacity, it is not subjected to plastic deformation during machining such as cutting. Therefore, the porous body does not clog.

Clogging of the porous body during machining can have an advantage in that bearing performance can be improved by properly controlling a clogging amount (Lecture Text, Autumn Meeting, Japan Society of Precision Engineering, P. 35 (1969)). It can be understood that an orifice is formed at an outlet of each of a large number of flow paths in the porous body. However, in a phenomenon of probability in which a large number of machining conditions such as plastic deformation during machining involve, it is difficult to cause desired clogging unless otherwise elaborated machining is performed. In addition, when dimensional accuracy as in the static pressure lead screw is required, it is impossible to satisfy both dimensional accuracy and the clogging amount. According to the present invention, nickel is plated on the ceramic porous body by electroless plating to optimize the flow rate (to be described in detail later). As shown in FIG. 4(a), after each flank 9 is formed to obtain desired geometrical accuracy by machining, portions indicated by hatched lines 9' are plated, so that the flow rate is adjusted to obtain maximum statical stiffness in accordance with the size of a screw gap 8. According to such plating (to be described in detail later), the thickness of the plated layer can be accurately controlled by a plating time. As compared with the conventional clogging effect, a desired flow resistance can be easily obtained.

In a conventional pneumostatic lead screw using a porous nut, the entire nut corresponding to the components 3 (solid base member) 19, and 12 in FIG. 4(a) is made of a porous material. As previously mentioned, the pneumatic hammer in the air bearing tends to occur when the flow path volume is large. Therefore, in the pocketed orifice restrictor and the porous restrictor, design of the flow path and setting of the flow rate must be taken into consideration to prevent the pneumatic hammer. However, in the static pressure lead screw of this embodiment, the volume of the porous body (a portion through which a gas flows) is minimized. As compared with the conventional case wherein the entire nut is made of the porous material, the flow path volume is small. In addition to the effect wherein the flow rate is optimized by the plated layer, the pneumatic hammer tends not to occur.

Electroless plating will be briefly described below. As is well known, electroless plating is performed such that metal cations are attracted to a cathode by an external current effect. Electroless plating in a broad sense includes a plating technique for reducing and precipitating metal cations in an electrolytic solution without using an external current and is often called chemical plating.

According to the feature of electroless plating, metal cations in an electrolytic solution are reduced and precipitated without using an external current. This method is classified into a technique in which cations of a metal (noble) having a higher potential than a metal (base) having a low potential are brought into contact with the base member to reduce and precipitate the noble metal as in substituted zinc plating or immersed gold plating, and a technique in which an object subjected to plating serves as a catalyst to reduce metal cations in an electrolytic solution and to precipitate a metal thereon as in chemical copper plating or electroless nickel (Ni) plating. It should be noted that a plating technique playing an important role on the industrial basis is a reduction method.

Electroless plating is based on a chemical reaction on the surface of an object to be plated. Unlike in electric plating, plating is not concentrated on a portion having a high electric field intensity. The thickness of the plated layer is uniform, and plating can be performed on a portion where no electric field is present, e.g., within the porous body. In this manner, electroless plating has features different from those of electric plating.

Electroless plating includes various methods, as described above. Of these methods, electroless nickel plating of a reduction method is most suitable as a means for controlling a flow resistance of a porous body and will be described in more detail below.

Figure 5:
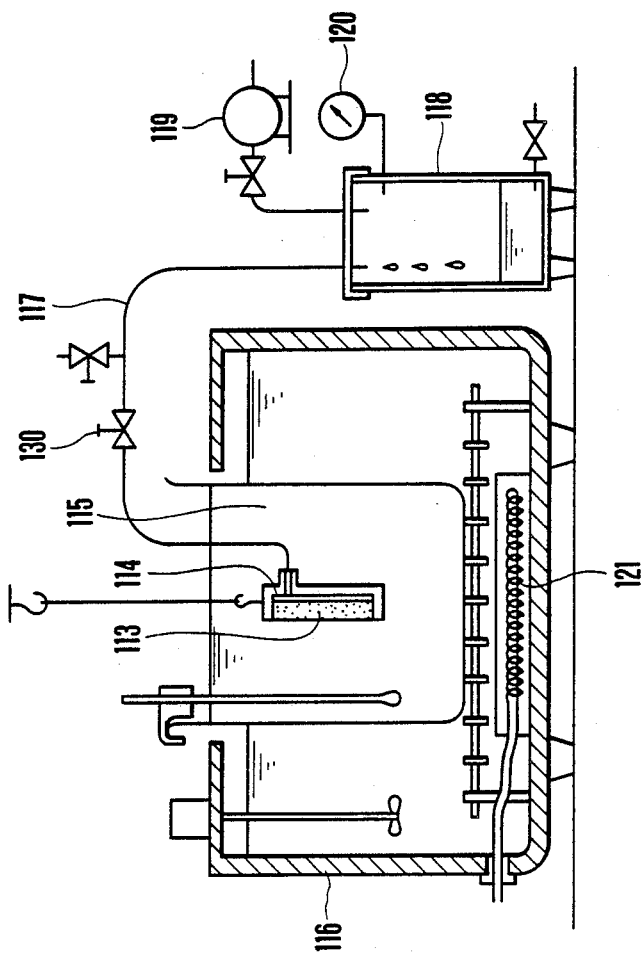
FIG. 5 is a view showing nickel electroless plating used for adjusting a flow resistance of a porous body according to a fifth embodiment of the present invention.

FIG. 5 is a view for explaining electroless nickel plating as a method of controlling a flow resistance of a porous body according to a fifth embodiment of the present invention. Reference numeral 113 denotes a nut to be plated with nickel; 114, a holder; 115, a plating tank; 116, a water thermostat; and 118, a negative pressure tank connected to the holder 114 through a pipe 117 and to a vacuum pump 119. Reference numeral 120 denotes a negative pressure meter; and 121, a heater. Electroless nickel plating has the features described above, and the thickness of the plated layer can be controlled to be constant by a dipping time if the temperature is kept constant. Referring to FIG. 5, the holder 114 exposes only a flank 109 of the nut 113 to a plating solution. An exhaust groove 105 of the nut 113 is connected to the pipe 117. Therefore, the permeation depth of the plating solution in the porous body can be controlled by a negative pressure of the negative pressure tank 118. When the negative pressure is set to zero by a valve arranged midway along the pipe 117, the plating solution reaches only the surface layer portion of the porous body. In this manner, electroless nickel plating allows arbitrary control of the permeation depth of the plating solution into the porous body by means of negative pressure suction as well as the thickness of the plated layer by the plating time. As compared with conventional mechanical clogging, the flow resistance of the porous body can be greatly, accurately, and easily controlled.

In addition to the effects of the above-mentioned embodiments, this embodiment provides the following effects.

(a) Since air (oil) supply efficiency of the porous restrictor can be improved as compared with the conventional restrictor and electroless nickel plating allows optimization of the flow resistance, the static pressure lead screw has high statical stiffness.

(b) Since the volume of the porous body having flow paths therein can be minimized, the pneumatic hammer tends not to occur even in a pneumostatic lead screw.

(c) Since the porous body is made of a ceramic material, no clogging during machining occurs. In addition, the ceramic material allows improvement of machining accuracy, is lightweight, andccan have a small dimensional change although a temperature change occurs. Therefore, the static pressure lead screw is suitable for high-speed, high-accuracy operation.

(d) Since the thread ridge angle can be freely selected, the static pressure lead screw has a variety of applications. In particular, the ridge angle is formed to define a line perpendicular to the screw axis, high-accuracy as the primary purpose of the static pressure lead screw can be achieved.

In addition, the static pressure lead screw having a nickel-plated layer has the same features as in the third embodiment described above.

Fifth Embodiment

The porous body surface of the static pressure lead screw shown in FIG. 5 is nickel-plated. However, nickel plating can be performed for a static pressure guide such as a static pressure bearing. The above description may be repeated in the following description to fully understand the effect of nickel plating.

In a static pressure guide comprising a rotatable or linearly movable floating member, a stationary member spaced apart from the surface of the floating member by a predetermined gap, and a fluid filled in the predetermined gap, at least a side of the floating member which defines the gap is made of a porous ceramic body, the porous ceramic body is fixed by a tubular base member through which a fluid does not flow, guide holes for supplying the fluid to the porous ceramic body extend through the tubular base member and are connected to the porous ceramic body, a surface layer of the porous ceramic body or an inner portion continuous with the surface layer is nickel-plated by electroless plating, thereby desirably clogging the porous body.

The above static pressure guide can be formed by electroless nickel plating shown in FIG. 5.

Since the arrangement shown in FIG. 5 is employed, the temperature of the Ni plating solution and the flow rate thereof flowing inside the porous body 113 can be arbitrarily controlled. After the porous body 113 is soaked with water and a flow control valve 130 is closed, the porous body 113 is dipped in the plating solution. In this case, permeation of the Ni plating layer into the porous body 113 depends on only diffusion. When Ni cations in the plating solution are permeated inside the porous body 113 deeper, the cations are attached to the wall surface inside the porous body 113 and are decreased. Therefore, a plated layer is limited to the surface layer portion of the porous body 113. Numerous pores present on the surface of the porous body 113 can be sealed. However, when plating is performed while the flow control valve 130 is open, an additional plating solution containing Ni cations is always replenished into the interior of the porous body 113. Therefore, the deep portion in the porous body 113 can be plated. The flow rate of the plating solution is controlled by a negative pressure of the negative pressure tank 118 and the flow control valve 130. The plating rate can be controlled by the temperature of the Ni plating solution. The amount of plating can be controlled by the plating time. For these reasons, the relationship between the plating amount and the flow resistance of the porous body is obtained in advance, and plating can be performed while the flow resistance is being measured during plating.

As a result, the following effects can be obtained. The flow resistance of the porous body can be accurately controlled. The flow resistance of the surface layer portion is set to be higher than that of the deep portion, thus increasing the control range of the flow resistance. In addition, the surface of the porous body can be sealed. Therefore, the unnecessary surface portion can be masked, thereby selectively obtaining a sealed surface portion of the porous body. As compared with the conventional technique utilizing plastic deformation, controllability of the flow resistance can be improved, and the control range can be widened. In addition, new effects are also obtained.

Furthermore, if the flow rate of the plating solution is controlled, the thicknesses of the plated layers can be decreased from the surface layer of the porous body to the deep layer.

The surface of the porous body 113 is turned with respect to the holding tool 114, a plated layer deep layer of the porous body 113 may be formed in addition to the plated surface layer.

Plating of a deep layer can be rarely performed in normal electric plating. In particular, Ni plating has an advantage in corrosion resistance.

The state in which Ni is plated in the porous body will be described below.

Figures 7A, 7B:
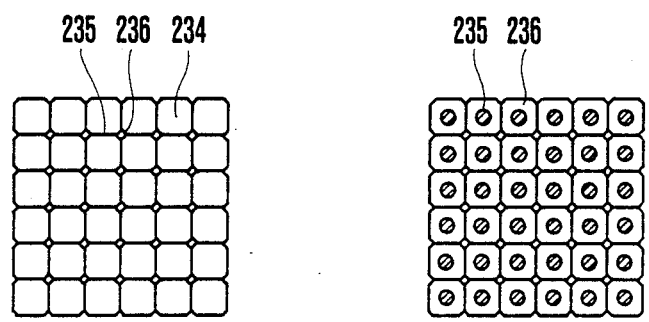
FIGS. 7(A) and 7(B) are sectional views showing a sintered porous body.

FIGS. 7(A) and 7(B) show sectional structure models of a sintered porous body. Referring to FIGS. 7(A) and 7(B), reference numerals 234 denote sintered particles;

235, bonding portions between the sintered particles 234; 236, voids, i.e., fluid paths of the sintered particles 234. FIG. 7(A) shows a section passing through the centers of the sintered particles 234, and FIG. 7(B) shows a section passing through the bonding portions 235 of the sintered particles 234. The sectional area of the flow paths 236 varies according to different sections, and the porous body is constituted as if gourd-like members are three-dimensionally stacked. For illustrative convenience in FIGS. 7(A) and 7(B), spherical sintered particles 234 having identical diameters are regularly aligned. However, in practice, sintered particles 234 having different sizes are randomly stacked. Uniform flow paths are not necessarily formed in the porous body, and therefore, flow paths of different sizes are mixed therein.

A conventional restrictor having a desired flow resistance can be precisely formed to constitute a static pressure guide if design allows such formation. However, a selection margin and uniformity of the diameter of the sintered particles 234 in the porous restrictor have limitations. In addition, since the porous body itself is formed by unique manufacturing techniques, it is not easy to obtain a desired flow resistance. Any means must be used to obtain a desired flow resistance in the existing porous material. In addition, a flow resistance control means is also required to increase a restrictor resistance in the surface layer portion, as described above.

Figure 6:
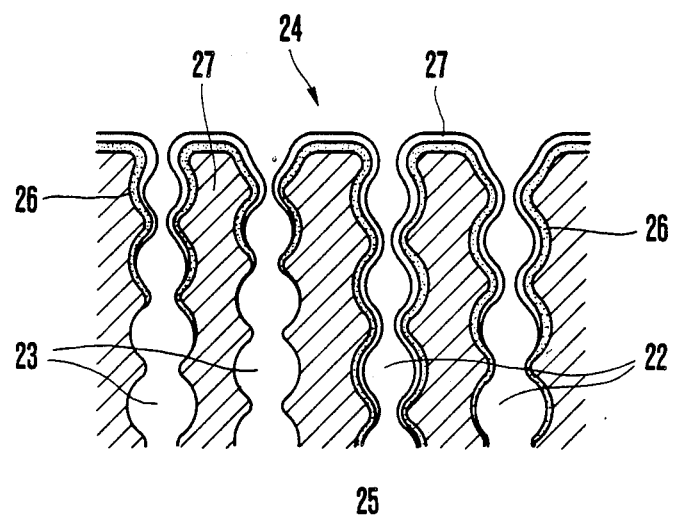
FIG. 6 is a sectional view showing a nickel-plated porous restrictor.

A sectional model having the porous restrictor plated with nickel is illustrated in FIG. 6. More specifically, reference numerals 22 denote thick flow paths formed due to nonuniformity of the porous body; 23, small flow paths formed due to the same reason; 24, a flow-in side of the plating solution; 25, a flow-out side of the plating solution; 26, deep-layer plated films formed inside the porous body by increasing a supply amount of plating solution; and 27, surface-layer plated films formed by decreasing the supply amount of plating solution.

The flow rate of the plating solution passing through the porous body can be controlled by a pressure difference between the flow-in and flow-out sides 24 and 25. In this case, since the plating solution flows through the porous body such that the resistance is minimized regardless of the positions of the plated layer, i.e., the deep- or surface-layer plated film. For this reason, the plating solution is concentrated in the large flow paths 22 having a small flow resistance. Therefore, the plating solution entered into a deeper portion through the large flow paths 22. The plating solution is limited to the surface layer through the small flow paths 23. Therefore, the total flow resistance of the porous body is uniform. However, since the plating solution is uniformly supplied to the flat portion on the surface of the porous body, the uniform thickness of the plated layer can be obtained, thereby maintaining flatness prior to plating.

As is known, the Ni-plated film itself is a hard film having high resistance to corrosion, high wear resistance. The Ni-plated film is thus a film free from plastic deformation. For this reason, even after Ni is plated in and on the porous body, more accurate machining of the surface of the porous body an be performed by grinding or lapping. In particular, when alumina (Al$_2$O$_3$), silicon nitride (SiN), silicon carbide (SiC) or the like is used as a ceramic material for a porous body, the porous body itself is free from plastic deformation. Therefore, ultra accurate machining can be made up to the layer underlying the plated layer by using a diamond tool. Performance of the static pressure guide which is directly associated with improvement of machining accuracy can be greatly improved as compared with the conventional case.

Figure 8:
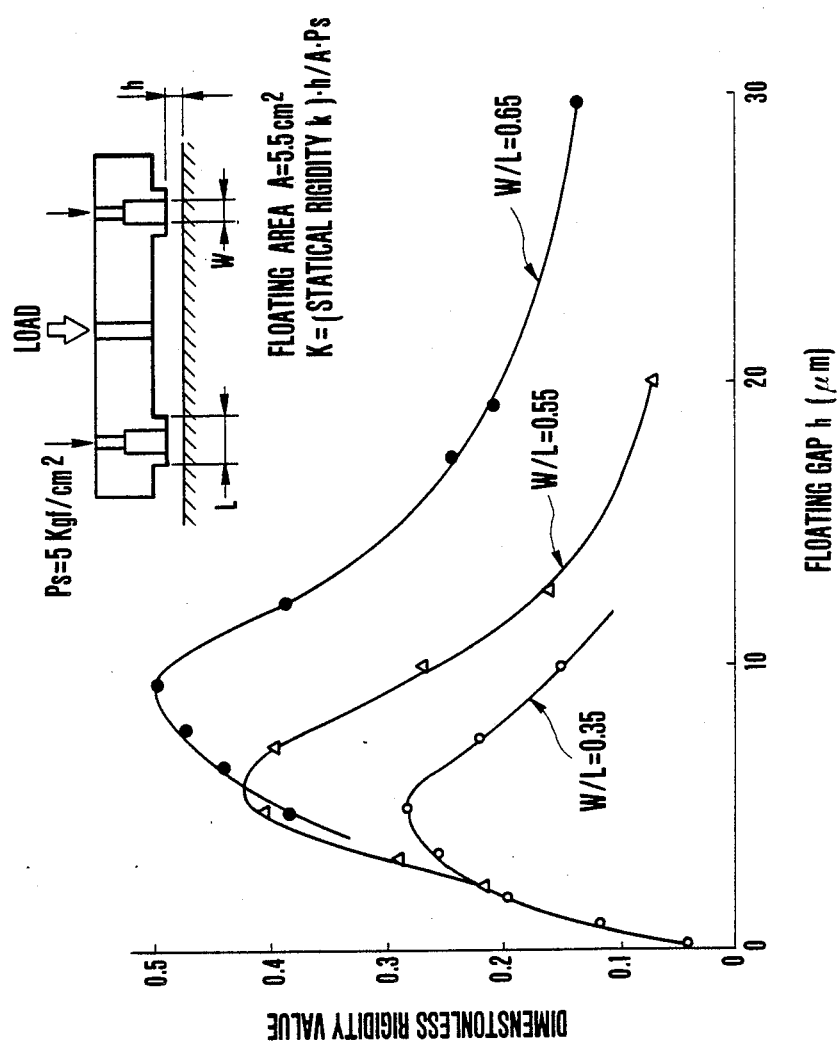
FIG. 8 is a graph showing the relationship between a floating screw gap h and statical stiffness k according to a static pressure floating test.

FIG. 8 is a graph showing test data representing characteristics of an Ni-plated porous restrictor bearing. As is apparent from FIG. 8, a load acted on a sample obtained by casting an annular porous portion in a ceramic disk, and compressed air was supplied to the porous portion. In this case, floating characteristics of the sample were measured. The dimensionless stiffness values are used to evaluate performance associated with bearing stiffness. In this case, stiffness of the bearing can be evaluated regardless of the shape and dimensions of the bearing and a supply pressure. As is apparent from FIG. 8, the Ni-plated porous restrictor bearing can have a dimensionless stiffness value of 0.5. In the conventional self-forming restrictor and the orifice restrictor, a maximum dimensionless stiffness value is as large as 0.2 to 0.3. Therefore, the porous bearing according to the present invention has a high stiffness value per unit area.

According to the embodiment described above, in the static pressure guide comprising a rotatable or linearly movable floating member, a stationary member spaced apart from the surface of the floating member by a predetermined gap, and a fluid filled in the predetermined gap, at least a side of the floating member which defines the gap is made of a porous ceramic body, and the porous body is subjected to sealing by means of electroless plating. The following effects are obtained.

(a) The flow resistance of the porous body can be accurately controlled.

(b) Both the surface and deep layers of the porous body can be plated, and the control range of the flow resistance can be increased by the degree of formation of the deep-layer plated film.

(c) The porous body can have the uniform flow resistance.

(d) Since the thickness of the plated film on the surface of the porous body is uniform, machining accuracy prior to plating can be easily maintained, and more accurate machining after plating can also be performed.

(e) The surface of the porous body can be sealed with plating.

(f) The porous metal body can be replaced with a porous ceramic body free from plastic deformation.

(g) Use of the porous ceramic body allows ultra accurate machining of the surface of the porous body.

Controllability of the flow resistance of the porous body can be greatly improved and the control range thereof can also be greatly widened. In addition, a starting material can be selected from various materials, a uniform flow resistance can be obtained, and the surface of the porous body can be selectively sealed.

Unlike in the conventional flow resistance control means utilizing plastic deformation in which the porous body has poor reproducibility and productivity and more accurate machining cannot be performed, all conventional drawbacks can be solved by the present invention. Furthermore, additional new advantages are also obtained by the present invention, thereby obtaining a static pressure guide utilizing advantages of the porous restrictor and having a small flow rate and high statical stiffness. The features of the porous restrictor static pressure guide having the flow resistance control means according to the present invention can be effectively utilized as a rotary bearing, a linear guide, a feed screw, or the like in a high-accuracy machine tool or measuring equipment requiring high speed, high stiffness, or high-accuracy positioning, and an apparatus for manufacturing electronic and optical components, or a semiconductor manufacturing apparatus.

The fluid supplied to the static pressure guide is not specified. However, a gas or a liquid may be supplied to the static pressure guide.

Sixth Embodiment

Figure 9:
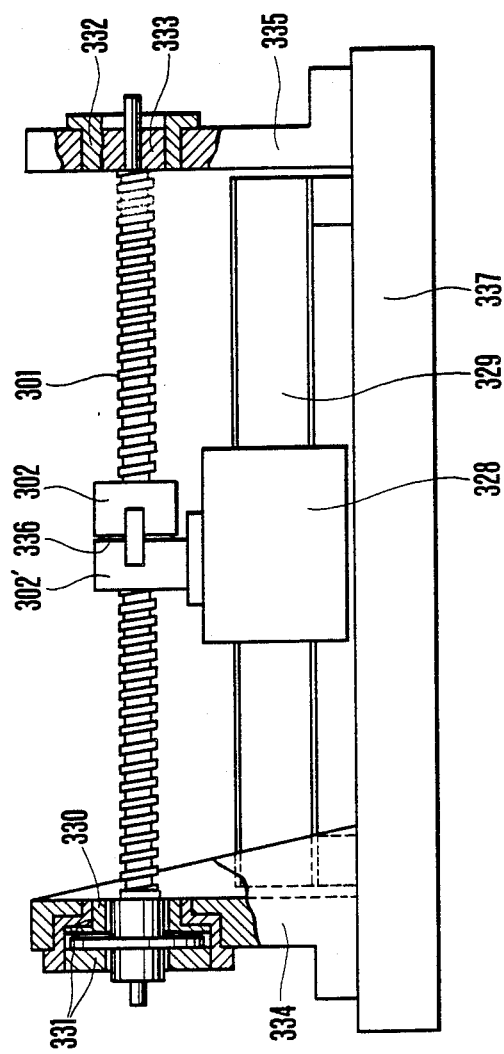
FIG. 9 is a static pressure uniaxial feed mechanism according to a sixth embodiment of the present invention.

FIGS. 9 to 12 shows a sixth embodiment showing a static pressure uniaxial feed mechanism constituted by static pressure screws of the present invention. Referring to FIG. 9, reference numeral 301 denotes a male screw shaft one end (left end) of which is supported by a flange of a thrust bearing 331 and a shaft for a radial bearing 330 and the other end (right end) of which is supported by a radial bearing 332 through a bushing 333. Reference numerals 302 and 302' denote nut cases into which the static pressure nuts constituting static pressure screws together with the male screw 301 according to the present invention are built. In this embodiment, two nuts are prepared as follows. One flank 9 of each thread ridge in FIG. 4(a) is sealed to prevent the fluid from flowing out from the porous body. The two nuts are joined together through a spacer 336 such that the right and left sealed surfaces are opposite to each other. A double-nut system is a conventional system used to adjust the preliminary load in the ball screw. The distance between the two nuts can be adjusted by changing the thickness of the spacer 336. A slider 328 connected to the male screw 301 is guided by the fluid bearing constituting a static pressure guide by means of a guide 329 along the longitudinal direction thereof. The guide 329, a stationary-side support plate 334, and a support-side support plate 335 are fixed on a base 337. The radial bearing 332 is constituted by the static pressure guide shown in FIG. 4(a).

When the static pressure lead screw is combined with the rotatable or linearly movable static pressure bearing to constitute a feed mechanism, the feed mechanism free from solid friction in the movable parts of the mechanism can be easily assembled. FIGS. 10(a) and 10(b) show test data representing ultra fine movement in the mechanism. A small rotation is given to the male screw by a fine movement actuator such as a piezoelectric element, and a linear displacement of the female screw is measured. More specifically, FIG. 10(a) shows a linear displacement of the female screw upon small rotation of the male screw, and FIG. 10(b) shows a linear stepwise displacement of the female screw when angular stepwise displacements are continuously applied to the male screw. As is apparent from FIGS. 10(a) and 10(b), the static pressure lead screw according to the present invention has a movement resolution in units of nanometers. This resolution cannot be achieved by a mechanism subjected to solid friction since it receives an influence of stick-slip, thus exhibiting a great effect of tee present invention.

Figure 11:
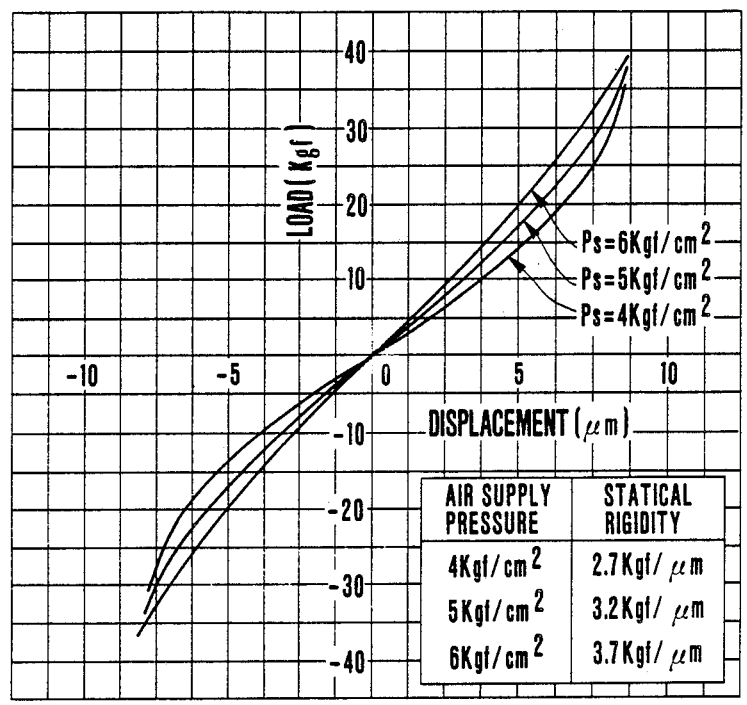
FIG. 11 is a graph showing the relationship between the axial statical stiffness and a load capacity in the static pressure uniaxial feed mechanism.

FIG. 11 shows measurement results wherein the displacement of the female screw with respect to the male screw, that is, a change in floating gap, is measured when an axial load acts on the female screw while the male screw is kept stationary. When the outer diameter of the male screw is given as 25 mm as a practical value, and the number of mating ridges per nut is 4, the statical stiffness (load/displacement) of the pneumostatic lead screw is higher than as 3 kgf/um when compressed air Ps having a pressure of 5 kgf/cm$^2$ is supplied. This is achieved by a combination of the following effects. Since the shape of the static pressure lead screw of the present invention is simplified, machining accuracy can be improved. Since the porous ceramic body has a flow resistance controlled by an Ni-plated layer, high stiffness per unit area can be achieved. In addition, the screw gap can be controlled in a double-nut system. It is apparent from the results in FIG. 8 that the stiffness value can be further increased by more accurate machining.

FIG. 12 shows test data obtained such that a rotary encoder is mounted on the male screw and a linear displacement of the female screw is measured by a laser interferometer while the angular displacement of the screw shaft is measured, and errors (lead errors complying with JIS B1192-1980, 1980) from ideal linear displacements with respect to the angular displacements. Referring to FIG. 12, a maximum variation e of the lead error is defined as a maximum value of variations from a recursive line of the cumulative lead errors within the overall screw length. A drunkenness e2$\pi$ is defined as a maximum width of a lead error within any one lead. The most troublesome factor in error correction is the drunkenness in order to improve feed accuracy. The drunkenness in the static pressure screw according to the present invention is as low as 0.2 $\mu$m or less. The lead accuracy after machining of the male screw was 2 to 3 $\mu$m in the test. Therefore, when the static pressure lead screw is employed, lead accuracy can be increased by 10 times or more. This is because errors in shape, surface and pitch of the components are averaged by the fluid film and motion accuracy can be improved. This effect is called an averaging effect. In the above embodiment, the female screw is interlocked with the male screw through eight ridges, thus obtaining the above-mentioned averaging effect. The fluctuation is an error smaller by about 1/10 than that of the conventional high-accuracy ball screw.

In addition, as shown in FIG. 9, when the static pressure lead screw is combined with a linear guide, the linear guide can be constituted by flat components. Therefore, machining can be performed with true linearity. Since the thread profile of the static pressure lead screw is a square, no bouyancy acts in the radial direction, thereby obtaining a feed mechanism with true linearity. When the thread profile is changed to a trapezoidal shape, the self-centering ability can be obtained. However, it is difficult to obtain a screw shaft with true linearity for machining the male screw. Even if such a lead screw is combined with a linear guide, the radial bouyancy acting on the female screw adversely affects true linearity of the feed mechanism. This drawback can be eliminated when the thread profile is changed to a square shape.

When the feed mechanism is constituted by using the static pressure lead screw, the following effects can be additionally obtained.

(a) Since the feed mechanism free from solid friction can be achieved, a very high feed resolution can be obtained.

(b) Since the double-nut system can be employed to further adjust the screw gap, statical stiffness of the lead screw can be improved.

(c) Feed accuracy can be improved 10 times that machining accuracy of the component itself due to the averaging effect of the fluid film.

(d) The square screw thread is combined with the linear guide to achieve a feed mechanism with true linearity.

What is claimed is:

1. A porous static pressure guide comprising a porous body of a ceramic material formed on a solid base member, wherein a guide hole is formed to extend through said solid base member and guided inside said porous body to supply a fluid to an interior of said porous body, thereby separating said porous body from an opposite object.

2. A guide according to claim 1, wherein said opposite object is movable along an axial direction of said solid base member.

3. A guide according to claim 1, wherein said porous body and said solid base member are movable along an axial direction of said opposite object.

4. A guide according to claim 1, wherein said solid base member, said porous body, and said opposite object are rotatable about one of said solid base member, said porous body, and said opposite object.

5. A guide according to claim 1, wherein said solid base member is made of a metal material.

6. A guide according to claim 1, wherein said solid base member is made of a ceramic material.

7. A static pressure guide including a rotatable or linearly movable first member and a second member spaced apart from a surface of said first member by a predetermined gap, said first and second members being separated from each other through a fluid filled therebetween, wherein said first member includes a solid base member and a porous body of a ceramic material formed on said solid base member to define at least the predetermined gap, and a guide hole is formed in said porous body to extend through said base member and guided inside said porous body to supply the fluid to an interior of said porous body, thereby separating said porous body from an opposite object.

8. A guide according to claim 7, further including a plated layer formed on at least a surface portion of said porous body.

9. A guide according to claim 7, wherein said solid base member is made of a metal material.

10. A guide according to claim 7, wherein said solid base member is made of a ceramic material.

11. A static pressure lead screw comprising a solid base member and a porous body of a ceramic material constituting at least part of a flank, wherein a guide hole is formed in said porous body to extend through said base member and guided inside said porous body to supply a fluid to an interior of said porous body, thereby separating said porous body from an opposite object.

12. A screw according to claim 11, wherein said flank constitutes a ridge having a tapered thread profile inclined in a direction perpendicular to an axis of said static pressure lead screw.

13. A screw according to claim 11, wherein said flank has a square ridge including a plane perpendicular to an axis of said static pressure lead screw.

14. A screw according to claim 11, further including a plated layer formed on at least a surface portion of said porous body.

15. A screw according to claim 11, wherein said solid base member is made of a metal material.

16. A screw according to claim 11, wherein said solid base member is made of a ceramic material.

17. A method of manufacturing a static pressure guide including a rotatable or linearly movable first member and a second member spaced apart from a surface of said first member by a predetermined gap and adapted to guide said first and second members through a fluid filled in the predetermined gap between said first and second members, including the step of forming a porous body of a ceramic material on a solid base member constituting said first member so as to define at least the predetermined gap, wherein a guide hole is formed to extend through said solid base member and guided inside said porous body to supply the fluid to an interior of said porous body, thereby separating said porous body from an opposite object.

18. A method according to claim 17, further including the step of forming a plated layer on at least a surface portion of said porous body.

19. A method according to claim 18, wherein the step of forming said plated layer comprises electroless nickel plating.

20. A method according to claim 17, wherein said solid base member has an annular shape.

21. A method according to claim 17, wherein the guide hole comprises a plurality of holes.

22. A method of manufacturing a static pressure screw, comprising:

forming a porous body of a ceramic material on a solid base member;

forming crests and roots such that at least part of a flank is constituted by said porous body; and forming a guide hole extending from an outside of said solid base member to an interior of said porous body, thereby separating said porous body from an opposite body through a fluid supplied to said porous body.

23. A method according to claim 22, wherein said solid base member has an annular shape.

24. A method according to claim 22, wherein the guide hole comprises a plurality of holes.

25. A method according to claim 22, wherein said flank constitutes a ridge having a tapered thread profile inclined in a direction perpendicular to an axis of said static pressure lead screw.

26. A method according to claim 22, wherein said flank has a square ridge including a plane perpendicular to an axis of said static pressure lead screw.

27. A method according to claim 22, further including the step of forming a plated layer on at least surface portion of said porous body.

28. A method according to claim 27, wherein the step of forming said plated layer comprises electroless nickel plating.

29. A method according to claim 22, wherein said solid base member is made of a metal material.

30. A method according to claim 22, wherein said solid base member is made of a ceramic material.

31. A feed mechanism comprising:

a screw rod rotatably supported above a base plate;

a static pressure nut meshed with said screw rod to constitute a static pressure lead screw;

a guide member disposed above said base plate and parallel to said screw rod; and a static pressure guide engaged with said guide member, wherein said static pressure nut comprises a first solid base member (302) and a porous body of a ceramic material formed on said first solid base member and constituting at least part of a flank, and a guide hole is formed in said porous body to extend through said base member and guided inside said porous body to supply a fluid to an interior of said porous body, thereby separating said porous body from said screw rod through the fluid, and said static pressure guide comprises a porous body of a ceramic material formed on a second solid base member (328) and a guide hole is formed in said porous body to extend through said second solid base member and guided inside said porous body to supply the fluid to an interior of said porous body from said guide member through the fluid.

32. A mechanism according to claim 31, wherein means for rotatably supporting said screw rod includes a static pressure guide member comprising a porous body of a ceramic material formed on a third solid base member (332), a guide hole being formed to extend through said third solid base member and guided inside said porous body to supply the fluid to the interior of said porous body, thereby separating said porous body from said guide member through the fluid.

* * * * *